Sept. 28, 1948. B. A. BAXTER 2,450,368
FILTER AND DEMOTHER
Filed Dec. 1, 1944 2 Sheets-Sheet 1

B. A. BAXTER
INVENTOR.

BY B. J. Craig,
ATTORNEY

Sept. 28, 1948.  B. A. BAXTER  2,450,368
FILTER AND DEMOTHER
Filed Dec. 1, 1944  2 Sheets-Sheet 2

B. A. BAXTER
INVENTOR.

BY
ATTORNEY

Patented Sept. 28, 1948

2,450,368

UNITED STATES PATENT OFFICE 2,450,368

FILTER AND DEMOTHER

Berry A. Baxter, Altadena, Calif.

Application December 1, 1944, Serial No. 566,219

2 Claims. (Cl. 21—127)

This invention relates to a filter and demother for vacuum cleaners.

The general object of the invention is to provide an effective, simple filtering and demothing device for vacuum cleaners by means of which a filtering and/or a demothing effect may be produced.

A more specific object of the invention is to provide a novel filter member for use in a vacuum cleaner.

A further object of the invention is to provide a vacuum cleaner having a novel filter member therein which provides a partition and thus forms a compartment for demothing crystals.

An additional object of my invention is to provide a vacuum cleaner having a filter supporting member therein, and including novel means for holding the member in place.

Other objects and the advantages of my invention will be apparent from the following description taken in connection with the accompanying drawings, wherein.

Figure 1:
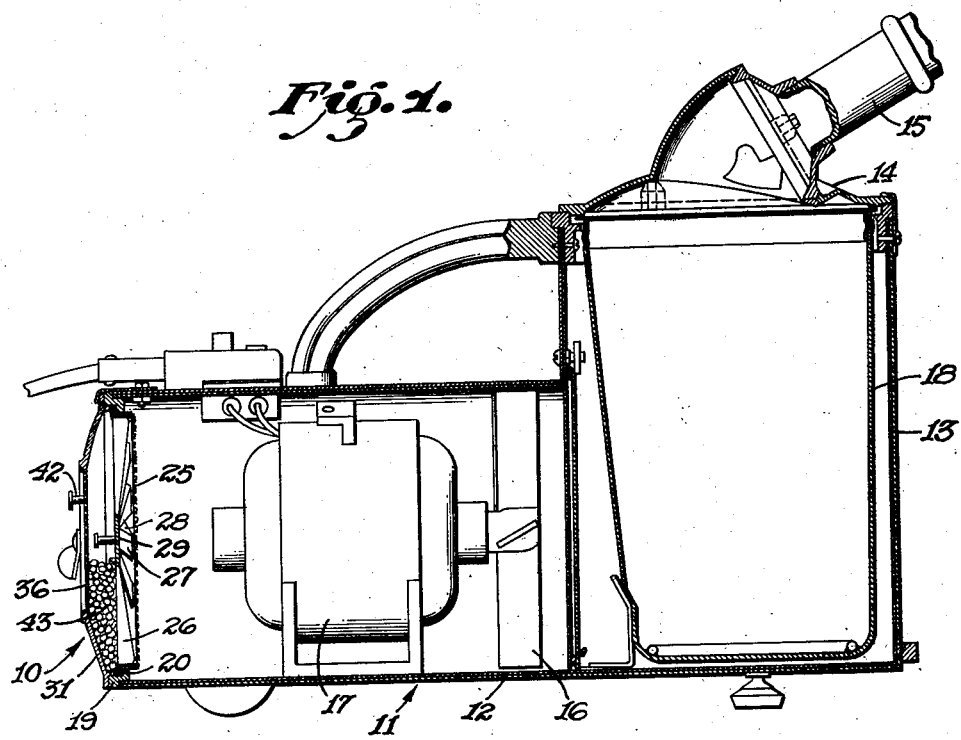
Fig. 1 is a central, sectional view through a vacuum cleaner embodying the features of my invention.
Figure 2:
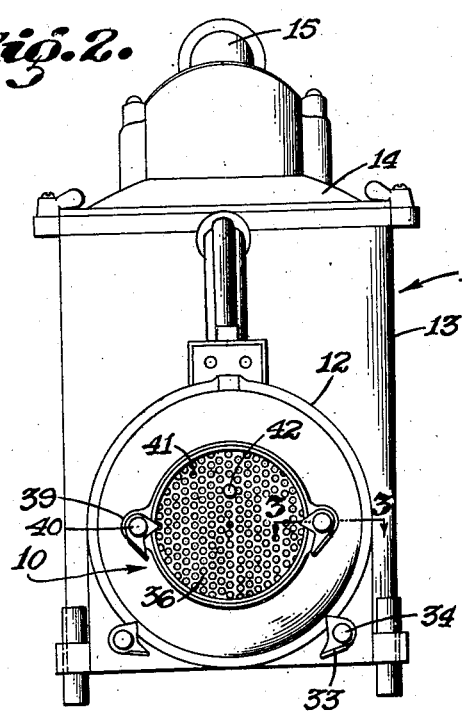
Fig. 2 is a front elevation of the vacuum cleaner.
Figure 3:
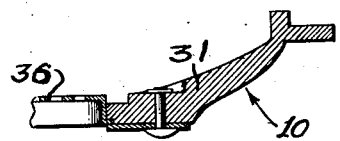
Fig. 3 is an enlarged section taken on line 3—3, Fig. 2.
Figure 4:
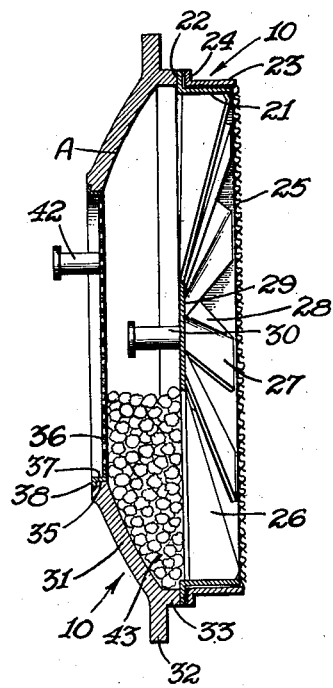
Fig. 4 is an enlarged, central, sectional view showing the air filter and demother construction.
Figure 5:
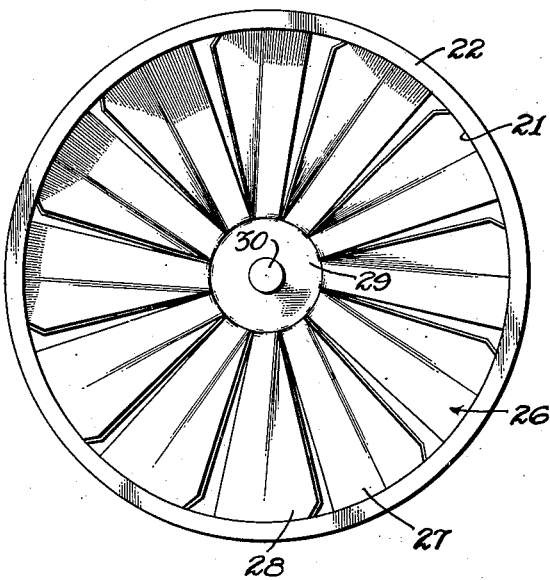
Fig. 5 is a front elevation showing the air filter support.

Referring to the drawing by reference characters, I have shown my invention as embodied in a combined air filter and demother for vacuum cleaners which is indicated generally as 10.

My improved receptacle is shown as applied to a vacuum cleaner 11 which is of the general type disclosed in my prior Patent 2,030,133, granted February 11, 1936. It will be understood, however, that my invention may be applied to vacuum cleaners of other types.

The vacuum cleaner shown includes a body 12 having a receptacle attached at one end thereof. The receptacle 13 is provided with a closure 14 which is attached to a suitable hose or other member 15 through which air is drawn by an impeller 16 driven by a motor 17. A dust bag 18 within the receptacle holds dust and other material drawn through the bag by the impeller 16.

The body 12, remote from the receptacle 13 and at the discharge end thereof, is provided with a collar 19 which is rabbeted as at 20.

The filter and demother 10 includes an inner annular filter supporting member 21 which has an outwardly extending member 21 thereon. The flange 22 is surrounded by a second annular filter retaining member 23 which has a flange 24 thereon. Between the members 21 and 23 I arrange the edge of a filter member 25 which may be made of cloth or other suitable material. The resiliency of the members 21 and 23 and their flanges serves to hold the filter member in place.

The member 21 supports a plurality of air deflecting blades 26 each of which includes an inner plane portion 27 and an outwardly directed vane portion 28. The portions 28 serve to direct the air column after it passes through the filter to whirl for a purpose to be later described.

The flat portions 27 serve to prevent the filter 25 from being drawn too far into the air stream. The portions 27 are connected at the center by an integral hub portion 29 from which a knob 30 extends. This knob 30 is to facilitate handling of the device.

In use the filter and demother 10 is placed so that it engages in the rabbet 20 with the flange 24 engaging the outer face of the rabbet 20. The member 21 and filter 25 thus forms a partition in the body 12. A closure 31 having an edge portion 32 is then arranged in the rabbet. The closure includes an inwardly directed flange portion 33 which engages the flange 22 to hold the filter supporting member in place. The closure 31 is held in place by clip members 33' which are pivotally mounted on pins 34. The closure 31 and the member 21 with the filter 25 thereon form a compartment A.

The closure 31 includes a central aperture 35 in which I arrange a disc member 36 which has a collar 37 thereon. The collar has a flange 38 which engages the end wall of the closure 31. Clips 39 similar to clips 33' and mounted on pins 40 removably hold the disc 36 in place. The disc member 36 is provided with perforations 41 through which air may pass. The disc member 36 includes a knob 42 which serves as a handle for removing the disc.

In use for demothing, the parts are assembled as shown in Fig. 1, the clips 39 are released and the disc member 36 is removed. Vaporizing demothing material which may consist of crystals 43 is then placed within the closure 31 whereupon the disc 36 is secured in place. When the vacuum sweeper is operated air passes through the filter 25 and is whirled by the vanes 28, causing it to pass through and thoroughly stir up the crystals 43 before it passes through the perforations 41 to the area to be demothed. In doing this the column of air evaporates a portion of the material of the crystals 43 and thus is conditioned to perform the demothing operation when discharged through the perforations 41.

The vanes 28 cause the whirling action, preventing the demothing material from packing and assuring a thorough demothing.

When the demothing operation is completed the closure 31 or disc member 36 may be removed and any remaining crystals may be removed, after which the closure or disc may be replaced.

When there is no demothing material between the closure 31 and the filter, the air column will advance and the very fine particles of material which pass through the dust bag 18 will be removed by the filter member 25. If desired, the filter supporting member 21 may be removed.

From the foregoing description it will be apparent that I have invented a novel filter and demother for vacuum cleaners which is easily made and assembled and which is highly efficient for its intended purpose.

Having thus described my invention, I claim:

1. A vacuum cleaner including a body having a collar at one end, a filter support in said collar, said filter support including an inner retaining member and an outer supporting member coaxial with the inner supporting member, a filter member having its periphery between said members, said inner member having a plurality of air deflecting blades thereon, each blade including a plane portion and a vane portion, the plane portions serving to limit the movement of the filter member, said inner member including a hub portion said plane portions being integral with the hub portion, a flange on said retaining member and disposed in engagement with the collar, a closure having a flange thereon engaging the filter support, means to hold the closure in position, said closure having an outlet aperture therein, a disc member disposed in said aperture, and means to hold the disc member in place, said disc member being spaced from said air deflecting blades, said disc member having perforations therein.

2. A vacuum cleaner including a body having an annular collar at one end, said collar including an annular rabbeted portion, an annular filter support in said collar, said filter support including an inner annular supporting member having an outwardly extending flange thereon and an annular outer retaining member coaxial with the inner supporting member, a flexible filter member having its periphery between said members, a flange on said outer supporting member and disposed adjacent to the first flange, said inner annular member having a plurality of air deflecting blades thereon, each blade including a plane portion and a vane portion, the plane portions serving to limit the movement of the filter member, said inner member including a hub portion said plane portions being integral with the hub portion, said hub portion having a knob thereon, the flange on said retaining member being disposed in engagement with the outer face of the rabbet, a closure having an inwardly directed flange thereon engaging the flange on the inner filter supporting member, releasable means to hold the closure in position, said closure having a central aperture therein, a disc member disposed in said aperture, means to releasably hold the disc member in place, said disc member being spaced from said air deflecting blades, said disc member having perforations therein, and an outwardly directed knob on said disc member.

BERRY A. BAXTER.

REFERENCES CITED

The following references are of record in the file of this patent:

UNITED STATES PATENTS

| Number | Name | Date |
|---|---|---|
| 1,938,378 | Ell | Dec. 5, 1933 |
| 1,965,765 | Ell | July 10, 1934 |